(12) United States Patent
Mantese et al.

(10) Patent No.: US 11,566,822 B2
(45) Date of Patent: Jan. 31, 2023

(54) FERROIC RESPONSE THROUGH APPLICATION OF CONJUGATE FIELD

(71) Applicant: Carrier Corporation, Jupiter, FL (US)

(72) Inventors: Joseph V. Mantese, Ellington, CT (US); Wei Xie, Manchester, CT (US); Subramanyaravi Annapragada, South Windsor, CT (US); Parmesh Verma, South Windsor, CT (US); Scott Alan Eastman, Glastonbury, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 291 days.

(21) Appl. No.: 16/620,777

(22) PCT Filed: Jun. 6, 2018

(86) PCT No.: PCT/US2018/036274
§ 371 (c)(1),
(2) Date: Dec. 9, 2019

(87) PCT Pub. No.: WO2018/231603
PCT Pub. Date: Dec. 20, 2018

(65) Prior Publication Data
US 2020/0200442 A1    Jun. 25, 2020

Related U.S. Application Data

(60) Provisional application No. 62/520,889, filed on Jun. 16, 2017.

(51) Int. Cl.
*F25B 21/00* (2006.01)
*H01F 1/01* (2006.01)

(52) U.S. Cl.
CPC ............. *F25B 21/00* (2013.01); *H01F 1/012* (2013.01); *F25B 2321/001* (2013.01); *F25B 2321/002* (2013.01)

(58) Field of Classification Search
CPC .............. F25B 21/00; F25B 2321/0021; F25B 2321/002; F25B 2321/001; H01F 1/012
See application file for complete search history.

(56) References Cited

U.S. PATENT DOCUMENTS

| 5,091,361 A | 2/1992 | Hed |
| 5,357,756 A | 10/1994 | Lubell |

(Continued)

FOREIGN PATENT DOCUMENTS

| CN | 1598443 A | 3/2005 |
| CN | 1946976 A | 4/2007 |

(Continued)

OTHER PUBLICATIONS

ISR/WO, dated Nov. 14, 2018, total 21 pages.
Lacaze a. f. et al., "Efficiency improvements of a double acting reciprocating magnetic refrigerator", Cryogenics, Elsevier, Kidlington, Gb, vol. 23, No. 8, Aug. 1, 1983, pp. 427-432.

(Continued)

*Primary Examiner* — Ana M Vazquez
(74) *Attorney, Agent, or Firm* — Cantor Colburn LLP

(57) ABSTRACT

A method of realizing a ferroic response is provided. The method includes applying a positive or negative conjugate field, which is of a first polarity, to a ferroic material to obtain a substantially minimized entropy of the ferroic material (301) and applying a slightly negative or a slightly positive conjugate field, which is of a second polarity opposite the first polarity, to the ferroic material to obtain a substantially maximized entropy of the ferroic material (302).

10 Claims, 6 Drawing Sheets

(56) References Cited

U.S. PATENT DOCUMENTS

| | | | |
|---|---|---|---|
| 6,826,915 | B2 | 12/2004 | Wada et al. |
| 8,429,920 | B2 | 4/2013 | Duval |
| 8,695,353 | B2 | 4/2014 | Casasanta |
| 8,904,806 | B2 | 12/2014 | Cramet et al. |
| 9,506,338 | B2 | 11/2016 | Difoggio |
| 10,365,019 | B2 * | 7/2019 | Muller ............ F25B 21/00 |
| 2006/0144048 | A1 | 7/2006 | Schulz |
| 2009/0158749 | A1 | 6/2009 | Sandeman et al. |
| 2013/0200293 | A1 | 8/2013 | Zhao et al. |

FOREIGN PATENT DOCUMENTS

| | | | | |
|---|---|---|---|---|
| CN | 101221001 | A | 7/2008 | |
| CN | 102734977 | A | 10/2012 | |
| CN | 103115454 | A | 5/2013 | |
| CN | 103748424 | A | 4/2014 | |
| CN | 105202799 | A | 12/2015 | |
| EP | 1847788 | A1 | 10/2007 | |
| EP | 2851634 | A1 | 3/2015 | |
| FR | 3028927 | A1 | 5/2016 | |
| JP | 2010054069 | A | 3/2010 | |
| WO | 2007099279 | A1 | 9/2007 | |
| WO | WO-2016083440 | A1 * | 6/2016 | ............ F25B 21/00 |

OTHER PUBLICATIONS

Lacaze AF et al., "Thermodynamical Analysis of a Double Acting Reciprocating Magnetic Refridgerator", Proceedings of the ninth international Cryogenic Engineering Conference Kobe, Japan, May 11-14, 1982, pp. 14-16.

Provenzano et al., "Reduction of Hysteresis Losses in the Magnetic Refrigerant Gd5GE2Si2 by the Addition of Iron", Nature, Jun. 2004, pp. 853-857.

Shen et al., "Recent Progress in Exploring Magnetocaloric Materials", State Key Laboratory for Magnetism, Institute of Physics, Chinese Academy of Sciences, Beijing 100190, China, 45 pages.

Meng et al., "Analysis of Static Experiment of Measuring Hysteresis Loops and Interpretation of Microcosmic Mechanism" Research and Exploration in Laboratory (2012) (5 pages).

Second Office Action issued in Chinese Application No. 201880052965. 1, Application Filing Date Jun. 6, 2018; dated Feb. 7, 2022 (13 pages).

Huang "Electromagnetism" Xian Jiaotong University Press, Dec. 2016 (5 pages).

Office Action issued in Chinese Patent Application No. 201880052965. 1; Application Filing Date Jun. 6, 2018; dated Jun. 22, 2022 (with partial English Translation and English Correspondence from Chinese Associate) [17 pages].

* cited by examiner

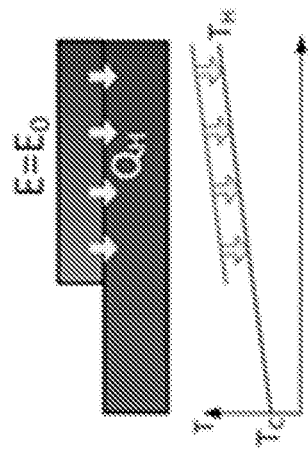
FIG. 2A
FIG. 2B
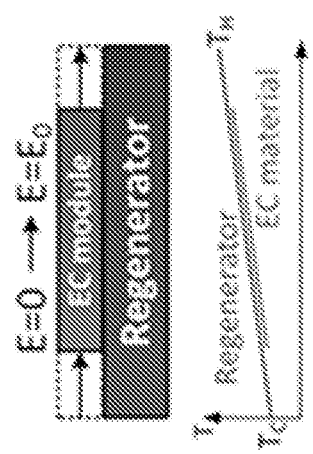
FIG. 2C
FIG. 2D
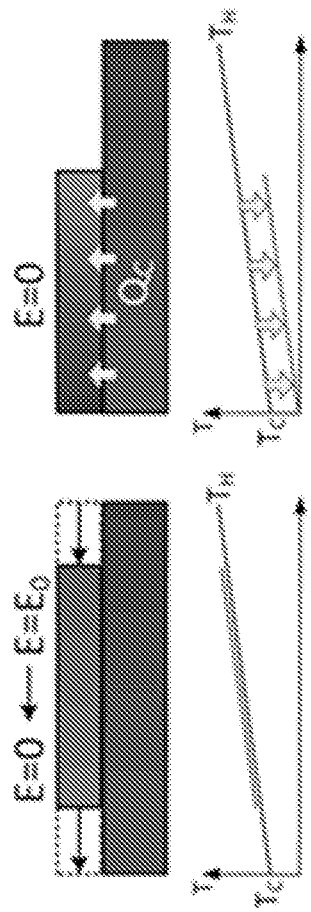

"multi-steps"

"alternating pattern"

"sine wave pattern"

"flattened sive wave"

"non-linear ramping"

"linear ramping"

FERROIC RESPONSE THROUGH APPLICATION OF CONJUGATE FIELD

CROSS-REFERENCE TO RELATED APPLICATIONS

This application claims the benefit of PCT/US2018/036274 filed Jun. 6, 2018, which claims priority to U.S. Provisional Application No. 62/520,889 filed Jun. 16, 2017, which is incorporated herein by reference in its entirety.

BACKGROUND

The following description relates to an improvement in realizing a ferroic response and, more particularly, to an improvement in realizing a ferroic response through the application of a conjugate field.

A wide variety of technologies exist for cooling applications. These include, but are not limited to, technologies that make use of evaporative cooling, technologies that make use of convective cooling and technologies that make use of solid state cooling (e.g., thermoelectric cooling technologies). With this in mind, one of the most prevalent technologies in use for residential and commercial refrigeration and air conditioning is the vapor compression refrigerant heat transfer loop. These loops typically circulate a refrigerant having appropriate thermodynamic properties through a loop that includes a compressor, a heat rejection heat exchanger (i.e., heat exchanger condenser), an expansion device and a heat absorption heat exchanger (i.e., heat exchanger evaporator). Vapor compression refrigerant loops effectively provide cooling and refrigeration in a variety of settings and in some situations can be run in reverse as a heat pump.

Many of the refrigerants used in vapor compression refrigerant loops can present environmental hazards such as ozone depletion potential (ODP) or global warming potential (GWP) or can be toxic or flammable. Additionally, vapor compression refrigerant loops can be impractical or disadvantageous in environments lacking a ready source of power sufficient to drive the compressor. For example, in an electric vehicle, the power demand of an air conditioning compressor can result in a significantly shortened vehicle battery life or driving range. Similarly, the weight and power requirements of the compressor can be problematic in various portable cooling applications.

Accordingly, there has been interest in developing cooling technologies as alternatives to vapor compression refrigerant loops.

BRIEF DESCRIPTION

According to one aspect of the disclosure, a method of realizing a ferroic response is provided. The method includes applying a positive or negative conjugate field, which is of a first polarity, to a ferroic material to obtain a substantially minimized entropy of the ferroic material and applying a slightly negative or a slightly positive conjugate field, which is of a second polarity opposite the first polarity, to the ferroic material to obtain a substantially maximized entropy of the ferroic material.

In accordance with additional or alternative embodiments, the ferroic material includes at least a magneto-caloric material and the positive or the negative and the slightly negative or the slightly positive conjugate fields include at least magnetic fields.

In accordance with additional or alternative embodiments, the ferroic material includes at least an electro-caloric material and the positive or the negative and the slightly negative or the slightly positive conjugate fields include at least electric fields.

In accordance with additional or alternative embodiments, the ferroic material includes at least an elasto-caloric material and the positive or the negative and the slightly negative or the slightly positive conjugate fields include at least stress fields.

In accordance with additional or alternative embodiments, the ferroic material includes a multi-ferroic material as a combination, composite, layered structure or alloy and one or more of the positive or the negative and the slightly negative or the slightly positive conjugate fields pertains to constituents of the multi-ferroic material.

In accordance with additional or alternative embodiments, the applying of the positive or the negative and the slightly negative or the slightly positive conjugate fields includes one or more of ramping the conjugate field non-linearly or linearly, applying the conjugate field in a sine wave or a flattened sine wave pattern, applying the conjugate field in multiple steps and applying the conjugate field in an alternating pattern.

In accordance with additional or alternative embodiments, the applying of the positive or the negative conjugate field includes applying multiple positive or multiple negative conjugate fields to obtain substantially minimized multi-dimensional entropy of the ferroic material and the applying of the slightly negative or the slightly positive conjugate field includes applying multiple slightly negative or multiple slightly positive conjugate fields to obtain substantially maximized multi-dimensional entropy of the ferroic material.

According to another aspect of the disclosure, a method of realizing a ferroic response is provided. The method includes applying a positive conjugate field to a ferroic material to obtain a substantially minimized first entropy of the ferroic material, applying a slightly negative conjugate field to the ferroic material to obtain a substantially maximized entropy of the ferroic material, applying a negative conjugate field to the ferroic material to obtain a substantially minimized second entropy of the ferroic material, which is opposite the substantially minimized first entropy and applying a slightly positive conjugate field to the ferroic material to obtain a substantially maximized entropy of the ferroic material.

In accordance with additional or alternative embodiments, the ferroic material includes at least a magneto-caloric material and the positive, the negative, the slightly negative and the slightly positive conjugate fields include at least magnetic fields.

In accordance with additional or alternative embodiments, the ferroic material includes at least an electro-caloric material and the positive, the negative, the slightly negative and the slightly positive conjugate fields include at least electric fields.

In accordance with additional or alternative embodiments, the ferroic material includes at least an elasto-caloric material and the positive, the negative, the slightly negative and the slightly positive conjugate fields include at least stress fields.

In accordance with additional or alternative embodiments, the ferroic material includes a multi-ferroic material and the positive, the negative, the slightly negative and the slightly positive conjugate fields include one or more of the conjugate fields.

In accordance with additional or alternative embodiments, the applying of the positive, the negative, the slightly negative and the slightly positive conjugate fields include one or more of ramping the conjugate field non-linearly or linearly, applying the conjugate field in a sine wave or a flattened sine wave pattern, applying the conjugate field in multiple steps and applying the conjugate field in an alternating pattern.

In accordance with additional or alternative embodiments, the applying of the positive and the negative conjugate fields includes applying multiple positive and multiple negative conjugate fields to obtain substantially minimized multi-dimensional entropy of the ferroic material and the applying of the slightly negative and the slightly positive conjugate fields includes applying multiple slightly negative and multiple slightly positive conjugate fields to obtain substantially maximized multi-dimensional entropy of the ferroic material.

According to yet another aspect of the disclosure, a ferroic response system is provided and includes a ferroic response element thermally interposed between a heat source and a heat sink and a controller. The ferroic response element includes a ferroic material and devices disposed to apply positive, negative, slightly negative and slightly positive conjugate fields to the ferroic material. The controller is configured to control the devices to apply the positive or the negative conjugate field, which is of a first polarity, to the ferroic material to obtain a substantially minimized entropy of the ferroic material and to enable heat transfer between the ferroic response element and the heat sink, or to control the devices to apply the slightly negative or the slightly positive conjugate field, which is of a second polarity opposite the first polarity, to the ferroic material to obtain a substantially maximized entropy of the ferroic material and to enable heat transfer between the ferroic response element and the heat source.

In accordance with additional or alternative embodiments, the ferroic response system further includes the heat sink, the heat source, a first valve, which is thermally interposed between the ferroic response element and the heat sink and which is controllable by the controller to enable the heat transfer between the ferroic response element and the heat sink and a second valve, which is thermally interposed between the ferroic response element and the heat source and which is controllable by the controller to enable the heat transfer between the ferroic response element and the heat source.

In accordance with additional or alternative embodiments, the ferroic material includes at least a magneto-caloric material and the positive or the negative and the slightly negative or the slightly positive conjugate fields include at least magnetic fields.

In accordance with additional or alternative embodiments, the ferroic material includes at least an electro-caloric material and the positive or the negative and the slightly negative or the slightly positive conjugate fields include at least electric fields.

In accordance with additional or alternative embodiments, the ferroic material includes at least an elasto-caloric material and the positive or the negative and the slightly negative or the slightly positive conjugate fields include at least stress fields.

In accordance with additional or alternative embodiments, the controller controls the devices to apply the positive or the negative and the slightly negative or the slightly positive conjugate fields along one or more of non-linear or linear ramping, sine wave or flattened sine wave pattern, multiple step schedules and an alternating pattern.

In accordance with additional or alternative embodiments, the devices are disposed to apply multiple positive or multiple negative conjugate fields to obtain substantially minimized multi-dimensional entropy of the ferroic material and multiple slightly negative or multiple slightly positive conjugate fields to obtain substantially maximized multi-dimensional entropy of the ferroic material.

In accordance with additional or alternative embodiments, the controller is configured to control the devices to apply the positive conjugate field to the ferroic material to obtain a substantially minimized first entropy of the ferroic material and to enable heat transfer between the ferroic response element and the heat sink, control the devices to apply the slightly negative conjugate field to the ferroic material to obtain a substantially maximized entropy of the ferroic material and to enable heat transfer between the ferroic response element and the heat source, control the devices to apply the negative conjugate field to the ferroic material to obtain a substantially minimized second entropy of the ferroic material, which is opposite the maximized first entropy, and to enable heat transfer between the ferroic response element and the heat sink, and control the devices to apply the slightly positive conjugate field to the ferroic material to obtain a substantially maximized entropy of the ferroic material and to enable heat transfer between the ferroic response element and the heat source.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 2A is a graphical depiction of electro-caloric regenerative cooling;

FIG. 2B is a graphical depiction of electro-caloric regenerative cooling;

FIG. 2C is a graphical depiction of electro-caloric regenerative cooling;

FIG. 2D is a graphical depiction of electro-caloric regenerative cooling;

These and other advantages and features will become more apparent from the following description taken in conjunction with the drawings.

DETAILED DESCRIPTION

Figure 1:
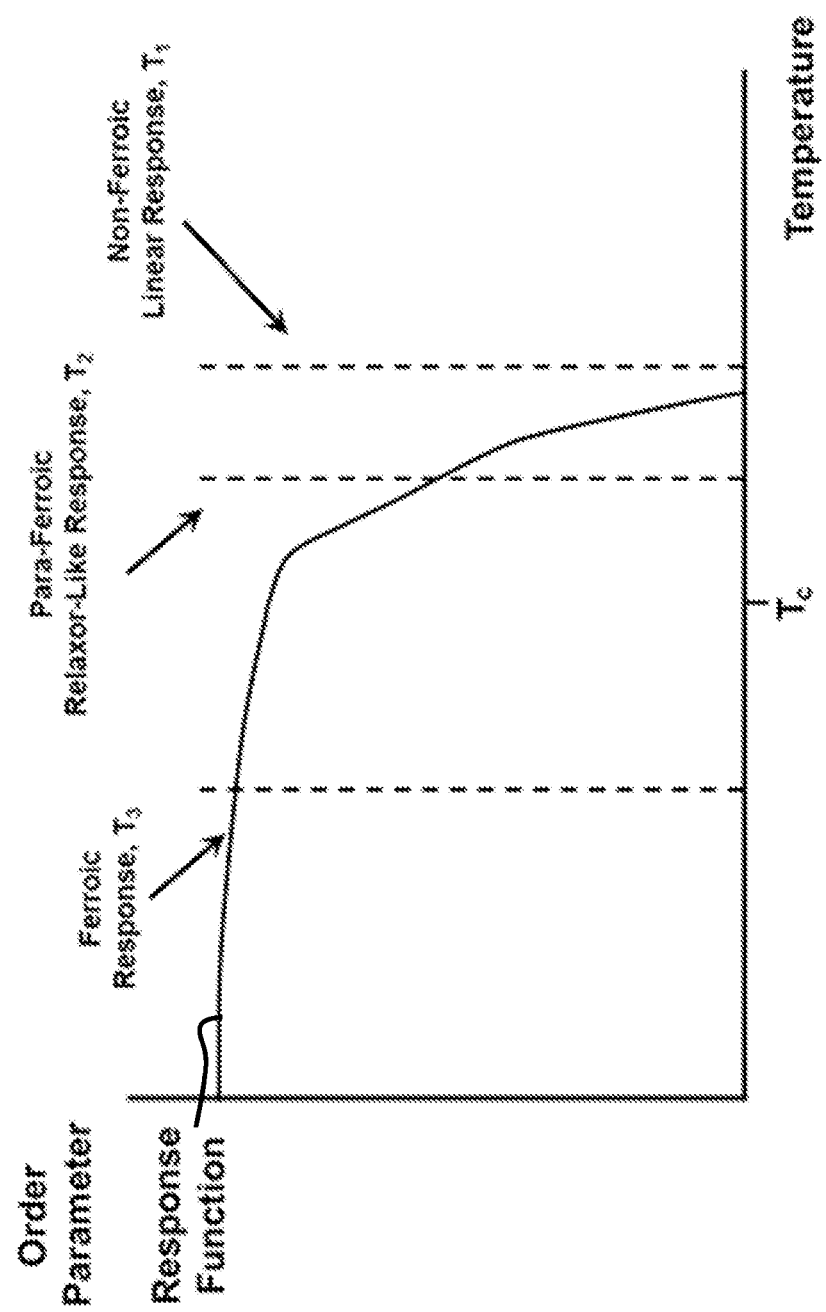
FIG. 1 is a graphical depiction of a temperature response of a ferroic material that transitions from a ferroic material above a Curie temperature where a first order phase transition is abrupt and a relaxor-like or second order transition to full ferroic behavior is distributed with decreased temperature.

With reference to FIG. 1, ferroic materials (e.g., magneto-calorics, elasto-calorics, electro-calorics and mixed ferroics) undergo first or second order phase transitions of their order parameters (e.g., the magnetic flux B for a magneto-caloric, the strain c for an elasto-caloric and the electric displacement D for an electro-caloric) around a Curie point Tc. Second order transitions can arise from local material inhomogeneities such as those arising from chemical variations, temperature gradients or stress fields or even non-uniform applications of a conjugate field. As shown in FIG. 1, when the temperature is significantly above Tc, the material is in a non-ferroic state (T1) but may be converted to a ferroic material through the application of a conjugate field (e.g., H, □ or E field in the examples above). In the para-ferroic state, there is partial conversion to the ferroic state because the order parameter is thermodynamically driven to this state by a decrease in temperature (T2). Finally, significantly below a Curie temperature, conversion to a full ferroic state occurs (T3).

Figure 3:
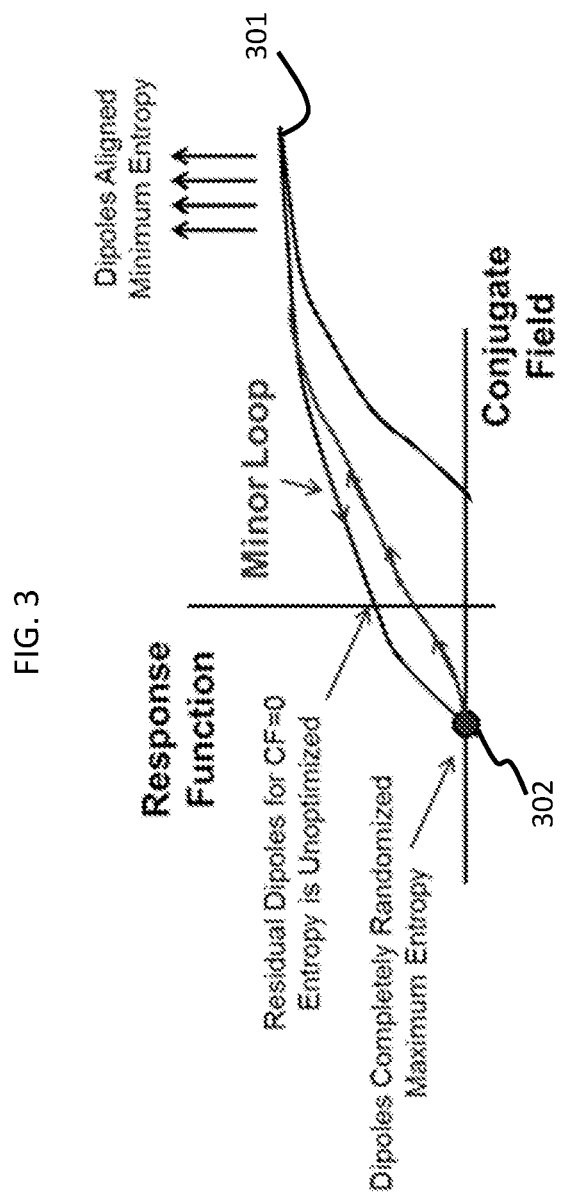
FIG. 3 is a graphical depiction of a method of realizing a ferroic response in accordance with embodiments.

With continued reference to FIG. 1 and with additional reference to FIGS. 2A, 2B, 2C and 2D and to FIG. 3, for ferroic-based cooling applications, one generally seeks material and temperature ranges that are slightly above the Curie temperature T1 for usage and typically operates such a material in a regenerative manner. Unfortunately, it is often difficult to adjust both the system operating temperatures and material compositions to operate near T1. Indeed, it frequently happens that the material composition is maladjusted and that the operating point occurs at T2 or T3. Operating a regenerator at T3 is suboptimal because a hysteresis loop develops for a ferroic material, as shown in FIG. 3, and results in a non-zero value for the order parameter (also called the response function) at a zero conjugate field. Hence, maximum entropy change and heat transfer is not entirely realized and overall efficiency of the regenerator is reduced.

In addition, it is seen that an application of unidirectional conjugate fields may exhibit additional adverse effects related to ferroic-based cooling systems. These include the fact that a unidirectional field may lead to a progressively more poled ferroic due to repeated cycling in one direction such that over time the ferroic "locks" in entropy that cannot be freed up to provide cooling and the cooling module consequently degrades in performance. Another adverse effect is seen is that an application of a unidirectional field often drives an accumulation of point, line and other microstructural defects toward accumulation points where they coalesce and eventually result in local material breakdown and sometimes complete material and module destruction. Unidirectional electric fields can also drive the accumulation of ionized impurity atoms (free Na+ ions being especially notorious) toward the high potential electrode where they cause dielectric breakdown.

Such performance reductions have been noted in all the caloric systems. Thus, as will be described below, a ferroic-based cooling method and system are provided which employ an application of a negative or slightly negative (or a positive or slightly positive) conjugate field to maximize entropy of a ferroic material at a given temperature and, in some cases, to disperse local defects throughout the body of the ferroic material to thereby provide for longer life modules in additional to improved performance.

With reference to FIG. 1 and FIG. 3, a method of realizing a ferroic response in, for example, a ferroic-based cooling system is provided. As shown in FIG. 3, the method includes applying a positive (or negative) conjugate field to a ferroic material with temperature T2 or T3 in order to obtain a minimized or a substantially minimized entropy of the ferroic material (location 301) and subsequently applying a slightly negative (or a slightly positive) conjugate field to the ferroic material in order to obtain a maximized or a substantially maximized entropy of the ferroic material (location 302). The method may further include repeating the applying of the positive (or the negative) and the slightly negative (or the slightly positive) conjugate fields to the ferroic material for a predefined period of time or for a predefined number of iterations. A similar approach may be performed with a material at temperature T1, having a remnant ferroic state that has not completely transitioned to a non-ferroic state.

As used herein, the substantially minimized entropy of the ferroic material may represent about 80-99% or 99-99.99% of the minimized entropy of the ferroic material (i.e., a degree of minimized entropy that would be associated with a non-zeroed field). Similarly, the substantially maximized entropy of the ferroic material may represent about 80-99% or 99-99.99% of the maximized entropy of the ferroic material (i.e., a degree of maximized entropy that would be associated with a non-zeroed field). For purposes of clarity and brevity, however, the following description will refer only to the minimized and maximized entropy but it is to be understood that such references also include the possibility of obtaining substantially minimized or substantially maximized entropy.

That is, for an electro-caloric material for example, a positive or negative conjugate field is applied to drive electric displacement of the electro-caloric material toward minimized entropy to thereby minimize entropy of the electro-caloric material and to generate heat that can be given off to the surrounding environment. Meanwhile, a non-zero negative or positive conjugate field is applied to drive electric displacement of the electro-caloric material to zero to thereby maximize entropy of the electro-caloric material and to absorb heat from the surrounding environment.

The application of conjugate fields can be realized in a variety of ways including, but not limited to, the application of subsystem components rather than fixed field components. Alternatively, where dielectric permittivity is strongly coupled to an electric field (i.e., where $\varepsilon = \varepsilon(E)$), the shape and the slope of the hysteresis loop can vary with the applied conjugate field.

Here, it is noted that FIG. 3 only illustrates that the positive and slightly negative conjugate fields are applied to the ferroic material held at a temperature T2 or T3 or a material with a remnant ferroic state. However, it is to be understood that the negative and slightly positive conjugate fields can be applied to similar effect in which case the "minor loop" would run in an opposite direction that what is shown. Nevertheless, the following description will relate only to the embodiment illustrated in FIG. 3 for purposes of clarity and brevity.

The illustrations of FIG. 3 are also applicable for ferroics operated below the Curie point, where the material becomes non-ferroic. In these cases, the ferroic nature is induced and the application of a small negative conjugate field drives the remnant ferroic to its non-ferroic state. As such, the graphical depiction becomes more complicated and is better realized as a time sequence of polarization states.

In accordance with embodiments, the ferroic material to which the positive and the slightly negative conjugate fields are applied may include magneto-caloric materials while the positive and the slightly negative conjugate fields may include magnetic fields, electro-caloric materials while the positive and the slightly negative conjugate fields may include electric fields and elasto-caloric materials while the positive and the slightly negative conjugate fields include stress fields. In addition, any other ferroic transition state other than these mentioned, as well as multi-ferroics that combine various ferroic elements may also be represented by this analysis. In accordance with further embodiments, and with reference to FIGS. 4A, 4B, 4C, 4D, 4E and 4F the applying of the positive and the slightly negative conjugate fields may be conducted in a non-singular-stepwise manner and may include one or more of non-linearly ramping the conjugate field (see FIG. 4A), linearly ramping the conjugate field (see FIG. 4B), applying the conjugate field in a sine wave pattern (see FIG. 4C), applying the conjugate field in a flattened sine wave pattern (see FIG. 4D), applying the conjugate field in multiple steps of any type (see FIG. 4E), applying the conjugate field in an alternating pattern of any type (see FIG. 4F) or any monitonically increasing function of the conjugate field. That is, in an exemplary case in which the ferroic material is electro-caloric and the conjugate field is an electric field, the applying of the positive conjugate field in the non-singular-stepwise manner may include a non-linear ramping up of a voltage of the electric field as shown in FIG. 4A, a linear ramping up of a voltage as shown in FIG. 4B, an application of voltage in a sine wave pattern as shown in FIG. 4C, an application of voltage in a flattened sine wave pattern as shown in FIG. 4D, an application of increasing voltage in multiple discrete steps as shown in FIG. 4E and an application of voltage in an alternating pattern of ramp-ups and ramp-downs as shown in FIG. 4F.

Figure 4E:
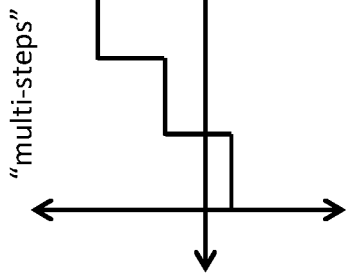
FIG. 4E is a graphical depiction of a method of applying a conjugate field to realize a ferroic response in accordance with further embodiments.
Figure 4F:
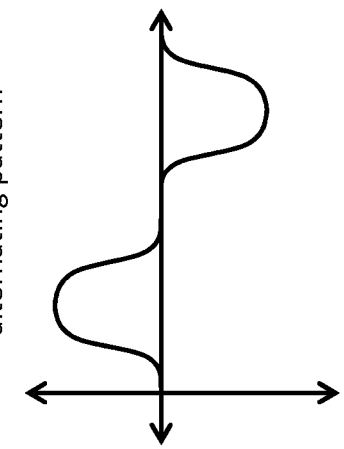
FIG. 4F is a graphical depiction of a method of applying a conjugate field to realize a ferroic response in accordance with further embodiments.
Figure 4C:
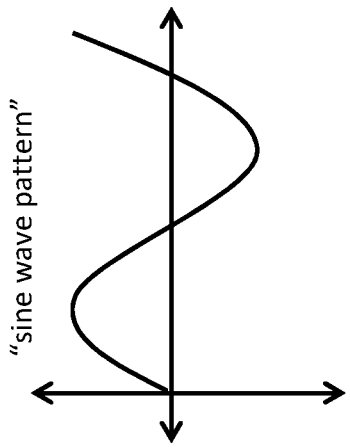
FIG. 4C is a graphical depiction of a method of applying a conjugate field to realize a ferroic response in accordance with further embodiments.
Figure 4D:
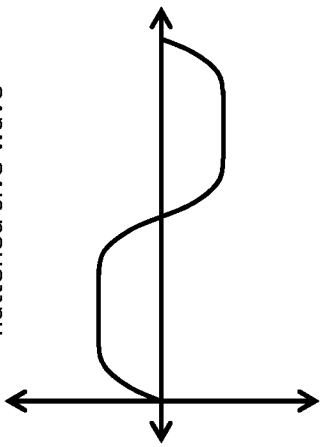
FIG. 4D is a graphical depiction of a method of applying a conjugate field to realize a ferroic response in accordance with further embodiments.
Figure 4A:
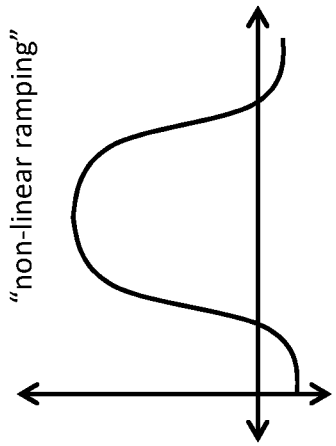
FIG. 4A is a graphical depiction of a method of applying a conjugate field to realize a ferroic response in accordance with further embodiments.
Figure 4B:
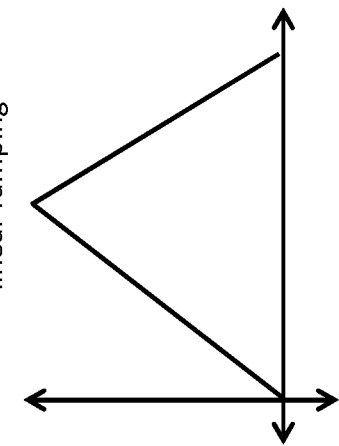
FIG. 4B is a graphical depiction of a method of applying a conjugate field to realize a ferroic response in accordance with further embodiments.

The non-linear and linear ramping of the conjugate field of FIGS. 4A and 4B, the application of the conjugate field in a sine wave or a flattened sine wave of FIGS. 4C and 4D, the application of the conjugate field in multiple steps of FIG. 4E and the application of the conjugate field in an alternating pattern of FIG. 4F provide for generally slower response times of the ferroic material in question but provide for less shock to the ferroic material in practice. Thus, while the response time of the ferroic material may be changed, the reduced shock to the ferroic material will tend to increase its lifetime over many cycles.

While FIGS. 4A, 4B, 4C, 4D, 4E and 4F provide examples of conjugate field application options, it is to be understood that other options exist in addition to or beyond what is disclosed herein. For example, one or more of the application options disclosed herein may include a constant or unchanging field application period in which an applied conjugate field is maintained at a predefined level. As another example, the various conjugate field application options may be combined with at least one or more of the other conjugate field application options in a hybridized case. As yet another example, a conjugate field application option may be modified or changed outright during an application thereof based on some combination of current conditions and material response information.

As a general matter, the phrase "non-singular-stepwise manner", as used herein, refers to any application of a conjugate field that is not a single instantaneous step from a "starting potential" to an "end potential."

In accordance with still further embodiments, where the ferroic material exhibits ferroic behavior in response to multiple types of conjugate field applications, the applying of the positive conjugate field may include applying multiple positive conjugate fields to the ferroic material to obtain a minimized multi-dimensional entropy of the ferroic material and the applying of the slightly negative conjugate field may include applying multiple slightly negative conjugate fields to the ferroic material to obtain maximized multi-dimensional entropy of the ferroic material. That is, where the ferroic material is magneto-caloric and electro-caloric, the multiple positive and the multiple slightly negative conjugate fields may include magnetic fields as well as electric fields.

Figure 5:
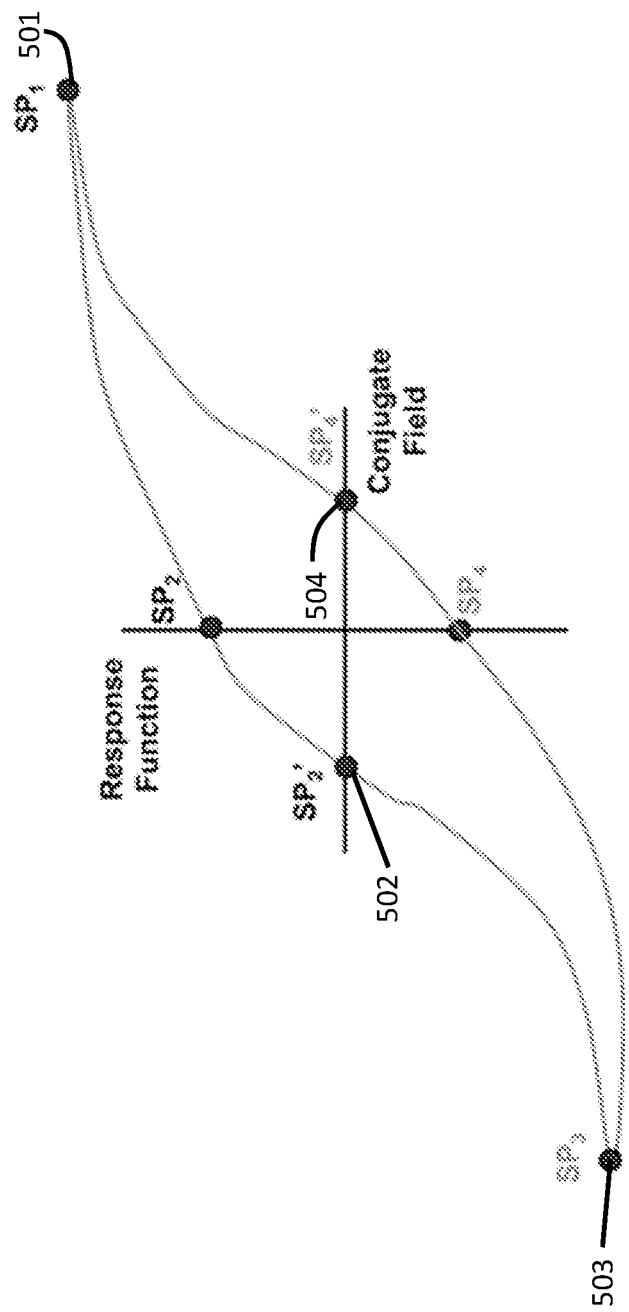
FIG. 5 is a graphical depiction of a method of realizing a ferroic response in accordance with embodiments.

With reference to FIG. 5, a further method of realizing a ferroic response in, for example, a ferroic-based cooling system is provided. As shown in FIG. 5, the method includes applying a positive conjugate field to a ferroic material to obtain a minimized first entropy of the ferroic material (location 501), applying a slightly negative conjugate field to the ferroic material to obtain a maximized entropy of the ferroic material (location 502), applying a negative conjugate field to the ferroic material to obtain a minimized second entropy of the ferroic material (location 503), which is opposite the minimized first entropy, and applying a slightly positive conjugate field to the ferroic material to obtain a maximized entropy of the ferroic material (location 504). The method may further include repeating the applying of the positive, slightly negative, negative and slightly positive conjugate fields to the ferroic material for a predefined period of time or for a predefined number of iterations.

As such, it is to be understood that the method of FIG. 5 is a generalization of the method of FIG. 3 and provides for a bi-directionally applied conjugate field. This bi-directionally applied conjugate field tends to distribute defects throughout the body of the ferroic material and thus leads to longer operating life and greater entropy conversion.

Figure 6:
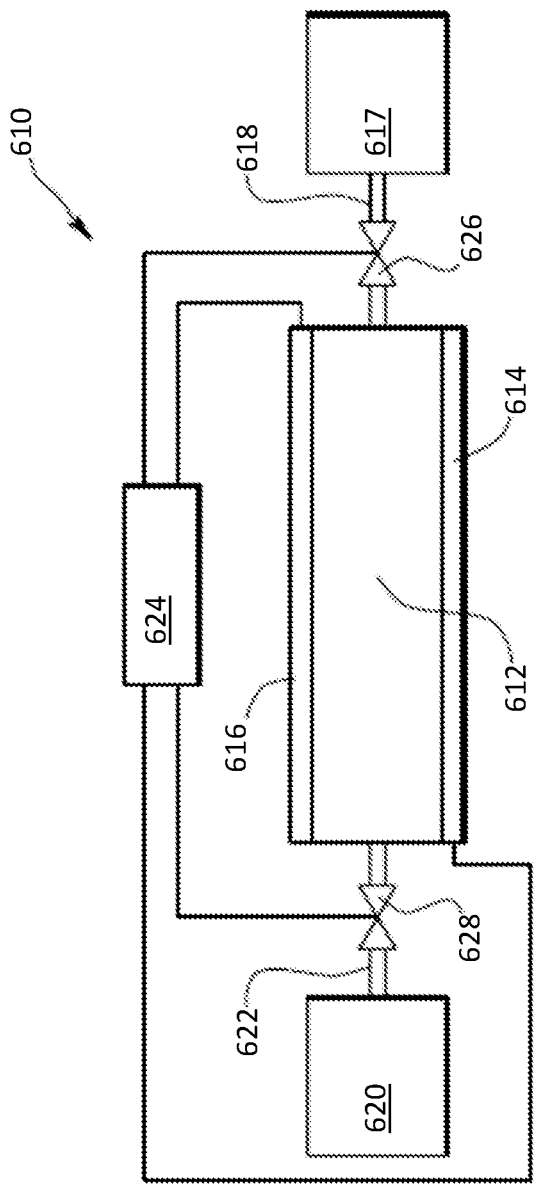
FIG. 6 is a schematic diagram of a ferroic response system in accordance with embodiments.

With reference to FIG. 6, a heat transfer system 610 is provided. The heat transfer system 610 includes a ferroic material film 612 having conjugate field application devices 614 and 616 on opposite sides thereof (in some cases, multiple ferroic material films 612 can be provided in parallel with each other or in a stack). The ferroic material film 612 and the conjugate field application devices 614 and 616 together form a ferroic element 611. In accordance with embodiments, the ferroic element 611 may be a magneto-caloric element, in which case the ferroic material film 612 is a magneto-caloric material and the conjugate field application devices 614 and 616 may be configured for example as electro-magnetic coils that can generate magnetic fields that can be applied to the magneto-caloric material. Alternatively, the ferroic element 611 may be an electro-caloric element, in which case the ferroic material film 612 is an electro-caloric material and the conjugate field application devices 614 and 616 may be configured for example as electrodes that can generate electric fields that can be applied to the electro-caloric material. In still other cases, the ferroic element 611 may be an elasto-caloric element, in which case the ferroic material film 612 is an elasto-caloric material and the conjugate field application devices 614 and 616 may be configured for example as piezoelectric actuators that can locally adjust and generate stress fields that can be applied to the elasto-caloric material. In accordance with still further embodiments, the ferroic element 611 may exhibit properties of two or more of magneto-caloric, electro-caloric and elasto-caloric materials as noted above.

The ferroic element 611 is disposed in thermal communication with a heat sink 617 through a first thermal flow path 618 and with a heat source 620 through a second thermal flow path 622. The first and second thermal flow paths 618 and 620 provide for thermal transfer of fluid through valves 626 and 628 and also permit conductive heat transfer through a transfer fluid (e.g., air, oil, dielectric), a solid state or thermomechanical set of switches that are disposable in thermally conductive contact with the electro-caloric element and either the heat sink 617 or the heat source 620. A controller 624 serves as an electrical power source and is configured to control power to selectively activate the conjugate field application devices 614 and 616. The controller 324 is also configured to open and close the valves 626 and 628 to selectively direct the heat transfer along the first and second flow paths 618 and 622.

In operation, in an exemplary case in which the ferroic element 611 is an electro-caloric element, the heat transfer system 610 can be operated by the controller 624 initially controlling the conjugate field application devices 614 and 616 to apply an electric field as a voltage differential across the ferroic material film 612 (i.e., the electro-caloric film) to thereby cause a decrease in entropy or to obtain a minimization of entropy in the ferroic element 611 and to thus obtain a corresponding release of heat energy by the ferroic element 611. At this point, the controller 624 opens the valve 626 to transfer at least a portion of the released heat energy along the first flow path 618 to the heat sink 617. This transfer of heat can occur after the temperature of the ferroic element 611 has risen to a threshold temperature. In some embodiments, heat transfer to the heat sink 617 is begun as soon as the temperature of the ferroic element 611 increases to be about equal to the temperature of the heat sink 617. In either case, after application of the electric field for a time to induce a desired release and transfer of heat energy from the ferroic element 611 to the heat sink 617, the electric field can be removed by the controller 624. Such removal causes an increase in entropy or a maximization of entropy in the ferroic element 611 and a corresponding decrease in heat energy of the ferroic element 611. This decrease in heat energy manifests as a reduction in temperature of the ferroic element 611 to a temperature below that of the heat source 320. The controller 624 thus closes valve 626 to terminate flow along the first flow path 618 and opens valve 628 to transfer heat energy from the heat source 620 to the colder ferroic element 611 in order to regenerate the ferroic element 611 for another cycle.

At this point, the controller 624 can either re-apply the originally applied electric field to the ferroic element 611 so that the ferroic element 611 follows the "minor loop" of the hysteresis curve of FIG. 3 or apply a new electric field as a voltage differential that is directed oppositely as compared to the original voltage differential. In the latter case, the ferroic element 611 follows the hysteresis curve of FIG. 5.

In some embodiments, for example where a heat transfer system is utilized to maintain a temperature in a conditioned space or thermal target, the electric field can be applied to the ferroic element 611 to increase its temperature to a first threshold. After this first threshold is reached, the controller 624 opens valve 626 to transfer heat from the ferroic element 611 to the heat sink 617 until a second threshold is reached. The electric field can continue to be applied during all or a portion of the time period between the first and second thresholds being reached and can then be removed to reduce the temperature of the ferroic element 611 until a third threshold is reached. The controller 624 can then close the valve 626 to terminate heat transfer along the first flow path 618 and open the valve 628 to transfer heat from the heat source 320 to the ferroic element 611. These operations can be optionally repeated until a target temperature of the conditioned space or thermal target (which can be either the heat source or the heat sink) is reached.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of realizing a ferroic response, the method comprising:
   applying a positive or negative conjugate field, which is of a first polarity, to a ferroic material to obtain a substantially minimized entropy of the ferroic material; and
   applying a second negative or a second positive conjugate field, which is of a second polarity opposite the first polarity, to the ferroic material to obtain a substantially maximized entropy of the ferroic material,
   wherein absolute values of respective magnitudes of the positive and negative conjugate fields exceed absolute values of respective magnitudes of the second negative and positive conjugate fields.

2. The method according to claim 1, wherein the ferroic material comprises at least an elasto-caloric material and the positive or the negative and the second negative or the second positive conjugate fields comprise at least stress fields.

3. The method according to claim 1, wherein the applying of the positive or the negative and the second negative or the second positive conjugate fields comprises one or more of ramping the positive or the negative and the second negative or the second positive conjugate fields non-linearly or linearly, applying the positive or the negative and the second negative or the second positive conjugate fields in a sine wave or a flattened sine wave pattern, applying the positive or the negative and the second negative or the second positive conjugate fields in multiple steps and applying the positive or the negative and the second negative or the second positive conjugate fields in an alternating pattern.

4. The method according to claim 1, wherein the applying of the positive or the negative and the second negative or the second positive conjugate fields comprises one or more of:
   a linear ramping up to a peak with a single slope and a linear ramping down from the peak with a single slope of the positive or the negative and the second negative or the second positive conjugate fields;
an application of the positive or the negative and the second negative or the second positive conjugate fields in a flattened sine wave pattern comprising a sine wave pattern in regions of minimal amplitude and flat patterns in regions of maximum amplitude; and
an application of the positive or the negative and the second negative or the second positive conjugate fields in multiple discrete increasing steps and multiple discrete decreasing steps with a peak between the multiple discrete increasing steps and the multiple discrete decreasing steps.

5. The method according to claim 1, wherein:
the applying of the positive or the negative conjugate field comprises applying multiple positive or multiple negative conjugate fields to obtain substantially minimized multi-dimensional entropy of the ferroic material, and
the applying of the second negative or the second positive conjugate fields comprises applying multiple second negative or multiple second positive conjugate fields to obtain substantially maximized multi-dimensional entropy of the ferroic material.

6. A method of realizing a ferroic response, the method comprising:
applying a positive or negative conjugate field, which is of a first polarity, to a ferroic material with temperature T2 or T3 to obtain a substantially minimized entropy of the ferroic material; and
subsequently applying a second negative or a second positive conjugate field, which is of a second polarity opposite the first polarity, to the ferroic material to obtain a substantially maximized entropy of the ferroic material;
wherein:
at the temperature T2, the ferroic material is in a para-ferroic state, and, at the temperature T3, the ferroic material is in a full ferroic state.

7. The method according to claim 6, wherein the ferroic material comprises at least an elasto-caloric material and the positive or the negative and the second negative or the second positive conjugate fields comprise at least stress fields.

8. The method according to claim 6, wherein the applying of the positive or the negative and the second negative or the second positive conjugate fields comprises one or more of ramping the positive or the negative and the second negative or the second positive conjugate fields non-linearly or linearly, applying the positive or the negative and the second negative or the second positive conjugate fields in a sine wave or a flattened sine wave pattern, applying the positive or the negative and the second negative or the second positive conjugate fields in multiple steps and applying the positive or the negative and the second negative or the second positive conjugate fields in an alternating pattern.

9. The method according to claim 6, wherein the applying of the positive or the negative and the second negative or the second positive conjugate fields comprises one or more of:
a linear ramping up to a peak with a single slope and a linear ramping down from the peak with a single slope of the positive or the negative and the second negative or the second positive conjugate fields;
an application of the positive or the negative and the second negative or the second positive conjugate fields in a flattened sine wave pattern comprising a sine wave pattern in regions of minimal amplitude and flat patterns in regions of maximum amplitude; and
an application of the positive or the negative and the second negative or the second positive conjugate fields in multiple discrete increasing steps and multiple discrete decreasing steps.

10. A method of realizing a ferroic response, the method comprising:
applying a positive or negative conjugate field, which is of a first polarity, to a ferroic material to obtain a substantially minimized entropy of the ferroic material; and
applying a second negative or a second positive conjugate field, which is of a second polarity opposite the first polarity, to the ferroic material to obtain a substantially non-ferroic state of the ferroic material,
wherein absolute values of respective magnitudes of the positive and negative conjugate fields exceed absolute values of respective magnitudes of the second negative and positive conjugate fields.

* * * * *